Feb. 6, 1968  C. C. SCHOTT  3,367,769
METHOD AND APPARATUS FOR CONTINUOUSLY MELTING SCRAP VEHICLES
Filed July 22, 1965  4 Sheets-Sheet 1

INVENTOR
Clarence C. Schott
BY
Bacon & Thomas ATTORNEYS

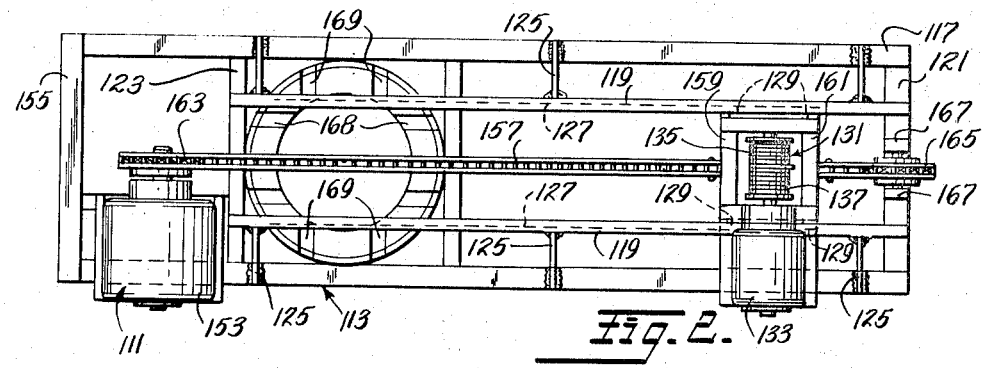

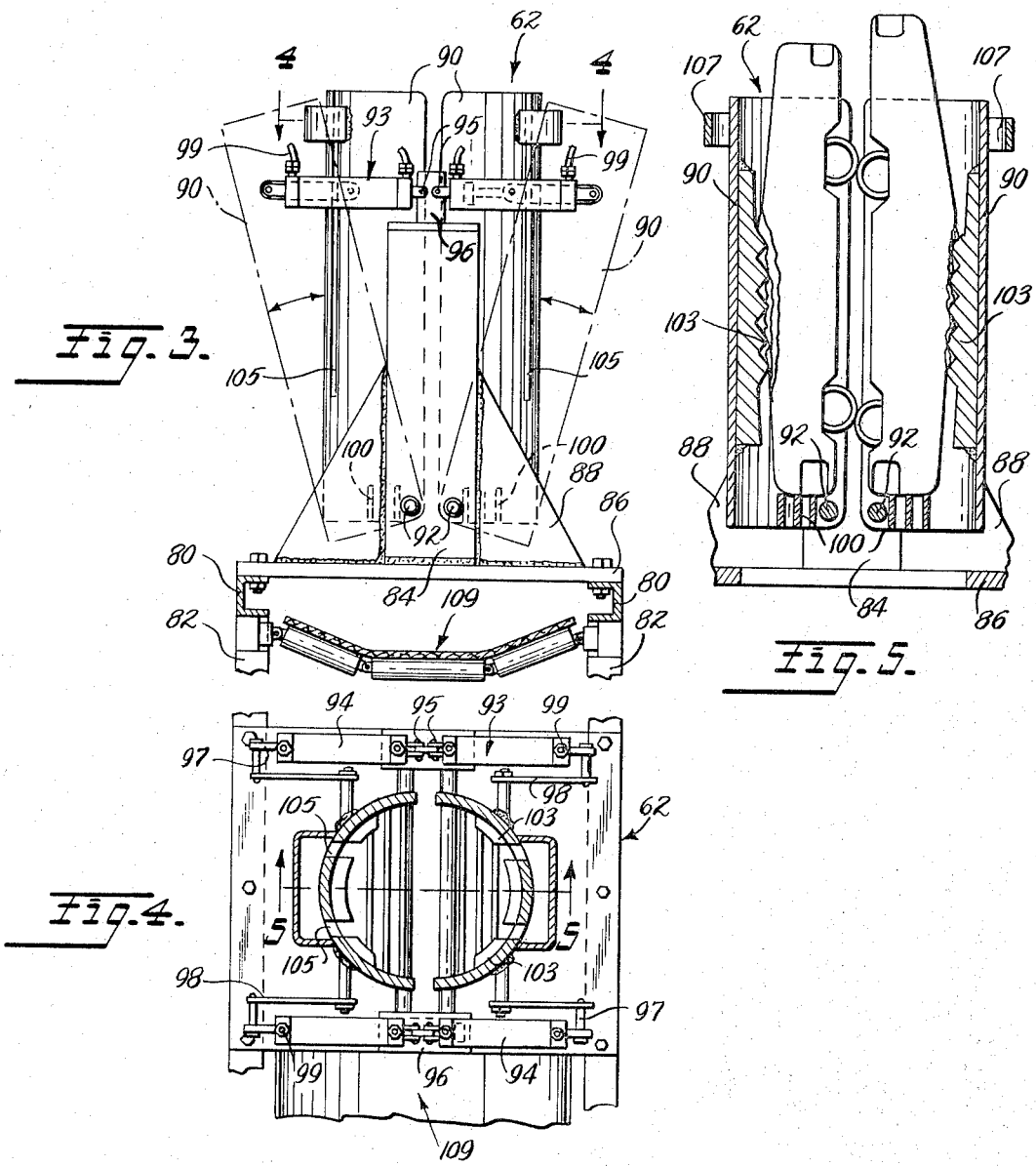

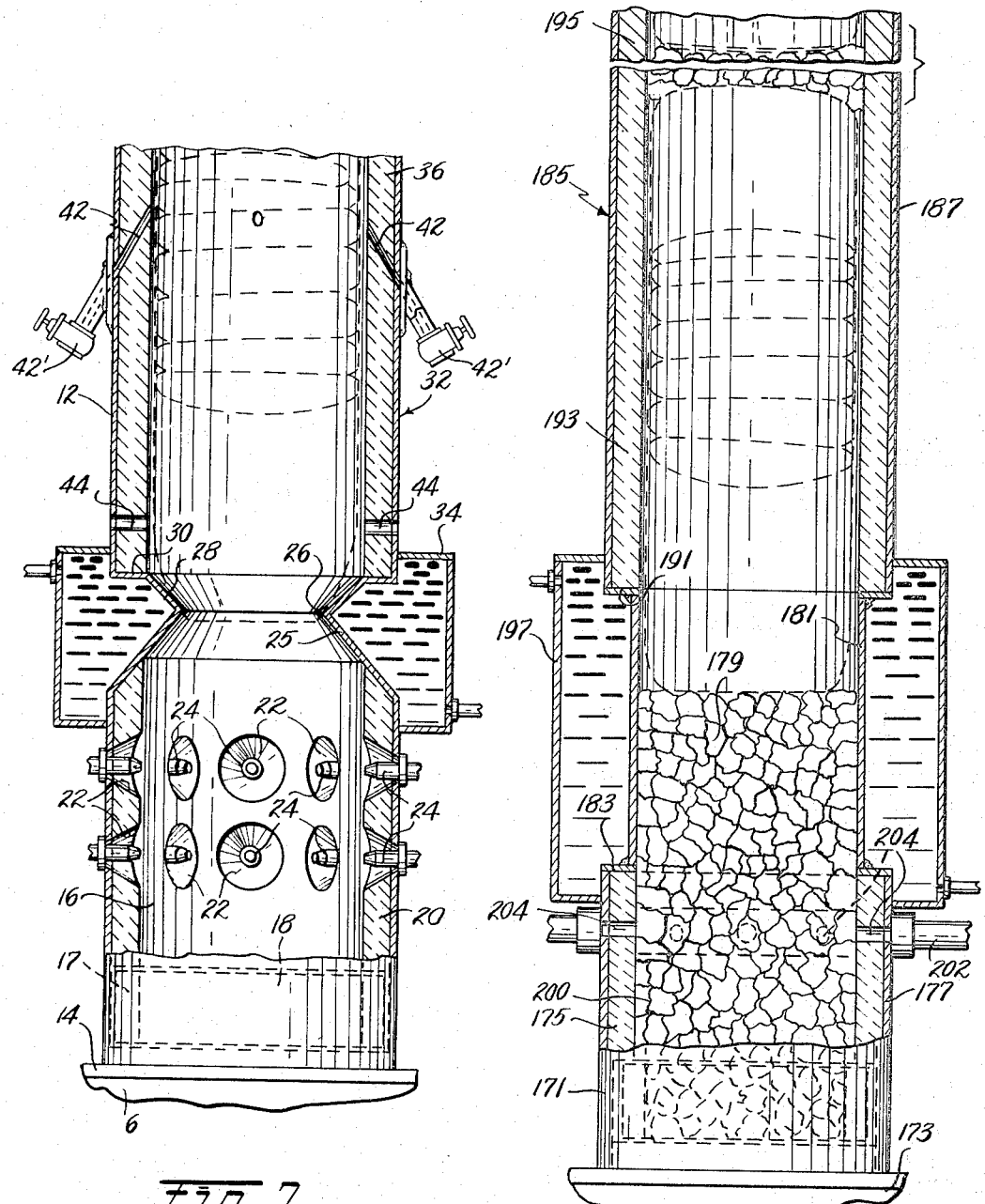

United States Patent Office 3,367,769
Patented Feb. 6, 1968

3,367,769
METHOD AND APPARATUS FOR CONTINUOUSLY MELTING SCRAP VEHICLES
Clarence C. Schott, 1209 Havenwood Road, Baltimore, Md. 21218
Filed July 22, 1965, Ser. No. 473,969
25 Claims. (Cl. 75—43)

ABSTRACT OF THE DISCLOSURE

Scrap vehicles are partially compressed in a squeezing apparatus and then lifted by a hoist and deposited on end, one on another, in the top opening of a furnace stack. An annular, water cooled ledge, located between the bottom of the stack and the top of the combustion chamber, has an opening smaller than the stack for engaging the lowermost scrap vehicle and supporting the entire column of vehicles in the stack. Progressive melting of the lowermost scrap vehicle results in the descent of the others in the column, the molten metal being collected in the hearth. The molten metal is withdrawn from the hearth into a trough, the slag separated from the molten metal and the molten metal deposited in a series of molds carried by the endless conveyor of a continuous pigging machine.

This invention relates to a method and apparatus for disposing of scrap vehicles in a rapid and continuous manner and for reclaiming the ferrous metals therefrom.

More particularly, the invention is directed to a processing system for disposing of scrap vehicles by compressing together pairs of whole scrap vehicle bodies to form a furnace charge, depositing several of the formed charges upon one another in the stack of a metal melting furnace and continuously melting the lowermost vehicle in the melting zone of the furnace, the molten metal resulting from the melting of the vehicles being withdrawn from the furnace hearth for molding, casting or other purposes.

In the past, only a small percentage of the vehicles scrapped have been processed in order to reclaim the ferrous metals contained therein. The usual processing includes disassembling from the body and chassis of the vehicle the motor and power transmission parts; and, also removing the tires, battery, and certain other miscellaneous parts. All or part of the various combustible parts and materials are then burned off the body and chassis. The body and chassis and other light steel parts are compressed into bales as single units, or after being cut up into smaller sections, are compressed into smaller bales, for reuse. The cast iron and other heavy metallic parts are used in molten-metal operations. This system requires a great deal of time, expensive equipment and manual labor. At the present time, vehicles are being scrapped at the rate of about 5,500,000 units per year in the United States. It is, therefore, desirable to recover the ferrous metal in these scrap vehicles as rapidly as possible in a readily usable form and at the lowest possible cost.

One of the objects of this invention is to provide an improved system for continuously processing whole scrap vehicles at a rapid rate in order to recover in readily usable form the ferrous metal content thereof.

Another object of this invention is to provide a process and apparatus for supporting a vertical column of whole scrap vehicles with the lowermost vehicle being disposed in a melting zone and for melting the lowermost vehicle in a reducing atmosphere.

A further object of the invention is to provide a process and apparatus for preheating whole scrap vehicles to be melted in order to burn out and remove therefrom non-metallic materials, such as upholstery, rubber, plastic, glass, etc., prior to melting the vehicles to reclaim the ferrous metals therefrom.

It is also an object of the invention to provide a novel method and apparatus for forming compressed charge units for a metal melting furnace from pairs of whole, scrap vehicles.

Another object of the invention is to provide a system for processing whole scrap vehicles in order to recover the ferrous metals therefrom which is rapid, economical, requires a minimum of manual labor and supervision, and is continuous for relatively long periods of time.

These and other objects of the invention will become more apparent from the following specification and claims when taken in conjunction with the drawings in which:

FIG. 2 is an enlarged, top plan view of the upper end of the apparatus employed for transporting the compressed vehicle bodies from the compressing apparatus to the upper end of the stack of the furnace;

FIG. 3 is an enlarged, side elevational view partly in section taken on line 3—3 of FIG. 1 showing the apparatus for compressing the scrap vehicles;

FIG. 4 is a cross-sectional view taken on line 4—4 of FIG. 3;

FIG. 5 is a slightly enlarged, cross-sectional view taken on line 5—5 of FIG. 4 showing the compressing apparatus in vertical cross section;

FIG. 6 is an enlarged, fragmentary cross-sectional view taken on line 6—6 of FIG. 1;

FIG. 7 is an enlarged, fragmentary, vertical cross-sectional view of the lower portion of the furnace taken on line 7—7 of FIG. 1;

FIG. 8 is an enlarged, front elevational view of the lifting tongs employed to grip the collapsed vehicles which are to be transported from the compressing apparatus shown in FIGS. 1, 3, 4 and 5 to the upper end of the stack of the furnace;

FIG. 9 is an end elevational view of the lifting tongs shown in FIG. 8; and

FIG. 10 is an enlarged, fragmentary, vertical, cross-sectional view similar to FIG. 7 but illustrating the lower portion of a modified form of the melting furnace.

Figure 1:
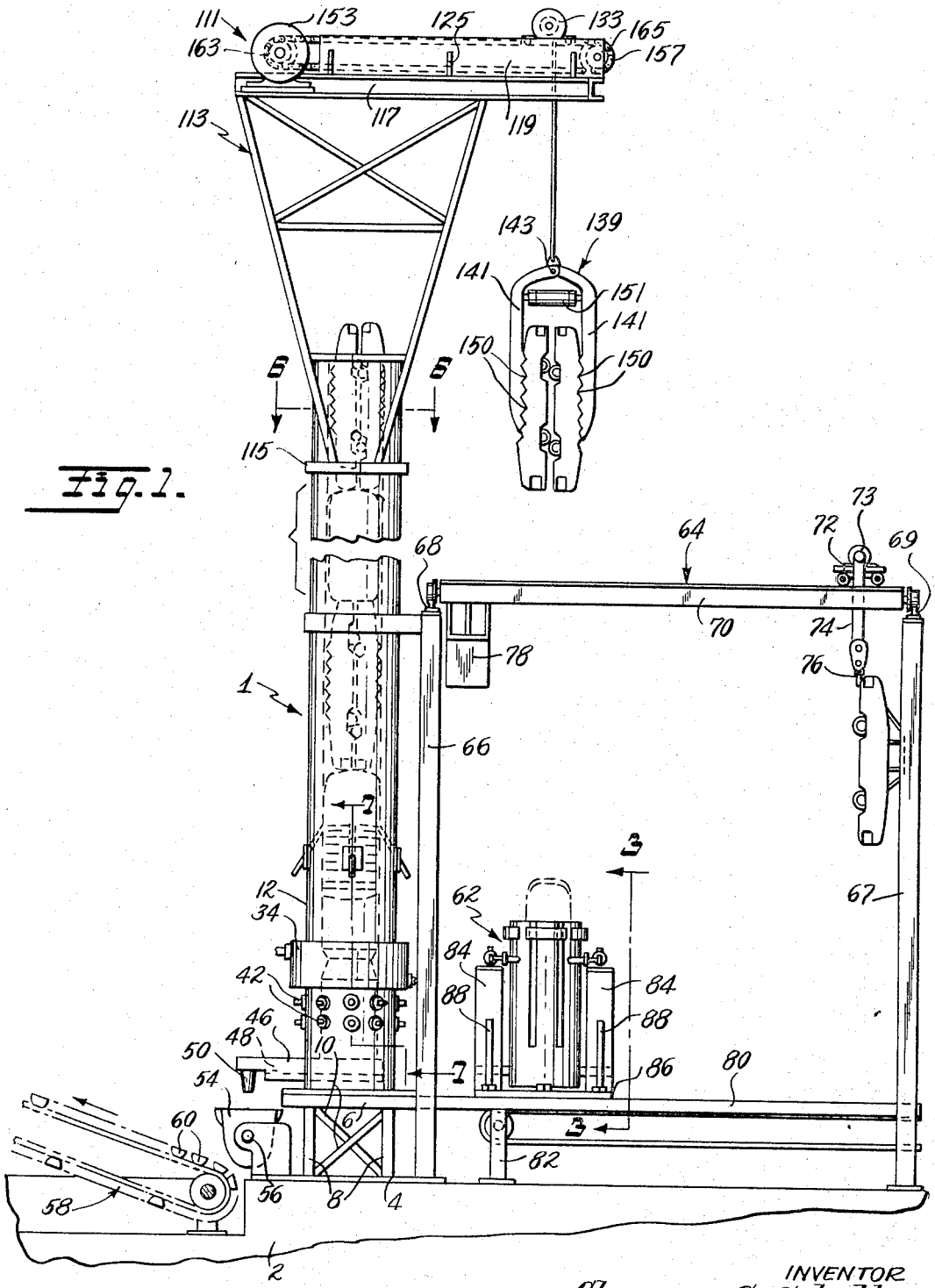
FIG. 1 is a side elevational view of the apparatus of the present invention, showing a stack furnace, the apparatus for compressing vehicle bodies, the apparatus for carrying vehicle bodies to the compressing apparatus and the apparatus for transferring the compressed vehicle bodies to the upper end of the stack of the furnace.

The stack type furnace generally designated by the numeral 1, as shown in FIG. 1, is supported above a suitable concrete foundation 2 upon a framework of steel members which includes a steel base plate 4 fixedly secured to the concrete foundation 2, and a conventional horizontally disposed bed plate 6 supported above the base plate 4 by vertically extending steel beams 8 which are braced by diagonal steel members 10.

The preferred embodiment of the furnace of this invention, which is illustrated in part in FIG. 7, is provided with an outer steel shell 12 extending upwardly from a steel bottom wall 14 fixedly secured to the bed plate 6. In this embodiment, the furnace hearth 16 is lined with graphite block 17 and the lower portion of the combustion chamber 18 disposed thereabove is lined with a suitable high temperature refractory insulation material or brick 20. Two vertically spaced, annular rows of equally spaced tapered openings 22 are formed in the steel shell 12 and in the refractory insulation material 20 forming the wall of the combustion chamber. Fuel burning nozzles 24 connected with a source of gas or oil under pressure, not shown, are pivotally mounted in the openings 22 in such a manner that their angularity in any direction may be quickly and easily adjusted for controlling the combustion of the fuel in the combustion chamber.

The upper portion of the combustion chamber 16, which is disposed above the fuel burning nozzles 24, includes a conical metal wall 25 tapering inwardly and upwardly a short distance to provide a restricted opening 26 at the upper edge thereof. A conical metal wall 28 extends upwardly and outwardly from the upper edge of the wall 25 and joins a radially inwardly extending metal support shoulder 30 formed at the lower end of the steel shell 12 of the stack 32 of the furnace. The metal walls 25 and 28, which are formed of heat and wear resistant steel and are located at or near the hottest zone of the combustion chamber, provide an offset which is free of a lining of insulating material and is cooled by water circulated through a water jacket 34 surrounding and enclosing the outer walls thereof. The wall 28 may be angled uniformly at from 0 to 45 degrees from the horizontal as required for supporting and controlling the rate of descent of the column of vehicles being melted while the wall 25 may be angled uniformly at about 60 degrees from the horizontal.

The stack 32 of the furnace extends upwardly from the shoulder 30 and is lined with high temperature brick 36 adjacent the lower end thereof wherein the temperature of the combustion gases passing upwardly therethrough is relatively high. The upper portion of the stack, above the area requiring the high temperature lining, is lined with relatively low cost, wear resistant, cast, ferrous metal blocks 40.

The stack 32 of the furnace, which is preferably circular as viewed in transverse cross-section, although it may be formed to have a different transverse configuration if so desired, is of substantially the same internal size from top to bottom and is constructed to be of a size which will permit whole scrap vehicles to be inserted or deposited in the upper end thereof and to allow the vehicles to slide freely downwardly therein under the influence of gravity to the lower end of the stack.

The opening 26 provided in the offset or restriction formed at the junction of the walls 25 and 28 is arranged to be smaller than the transverse dimension of the vehicles or of the charge units comprised of a pair of vehicles to be inserted in the stack 32 and the wall 28 forms a support flange for a vertical volume of the vehicles disposed on upon another in the stack. The scrap vehicles may be inserted on end, one by one in the upper end of the stack to rest on one another or pairs of scrap vehicles forming a charge unit may be inserted on end in the upper end of the stack to form a vertical column of the charge units. In either case, the transverse dimension of the interior of the stack is such as to fit closely around the vehicles while at the same time permitting them to slide freely downwardly therein until they reach the support wall 28.

The furnace 1 is preferably but not necessarily operated with a reducing atmosphere in the combustion chamber 16 in order to prevent oxidation of the metal. The offset or restriction provided by the walls 25 and 28 may, under certain conditions, somewhat restrict the flow of the combustion products upwardly through the opening 26 and make it possible to better control the rate of combustion of the fuel being supplied to the combustion chamber. A reducing atmosphere is maintained in the combustion chamber by furnishing thereto air for supporting combustion at a rate which is less than that required for complete combustion of the fuel.

A plurality of upwardly and inwardly inclined induced air passages 42 are formed in the steel shell 12 and in the stack lining 36, for furnishing sufficient air to the stack to complete combustion of the unburned fuel in the hot gases passing upwardly therethrough. The air passages 42 are formed in the stack a short distance above the combustion chamber and in a zone where the temperature of the combustion gases is sufficiently high to result in the ignition and the complete combustion of the unburned fuel therein upon the introduction of sufficient air into the stack.

The heat from the hot combustion gases passing upwardly through the stack and the additional heat liberated as a result of completing the combustion of the unburned fuel in the stack, is advantageously employed to preheat a column of scrap vehicles in the stack to a relatively high temperature which is below the melting point of ferrous metals but is above the melting point of material such as rubber, plastic, upholstery, glass, paint, etc., to burn such material out of the vehicles while they are in the furnace stack and before they reach the combustion zone of the furnace. The rate of flow of the air through the passages 42 may be controlled by suitable closures or valves, such as 42' shown only in FIG. 7, associated with each of the passages 42, in order to supply to the stack at least the amount of air required to complete combustion of the unburned fuel in the hot gases.

In the furnace described thus far, the lowermost vehicle or vehicles resting of the support wall 28 will be progressively melted and the rate of descent of the vehicles in the column will be controlled by the rate of melting of the lowermost vehicle. In the event that unmelted portions of the scrap vehicles become lodged or hung-up on the support wall 28, a suitable number of horizontal openings 44 are formed in the steel shell 12 of the stack 32 and in the stack lining 36 adjacent the upper surface of the support wall 28 through which oxygen or acetylene lances may be inserted for melting or burning the unmelted portions of the vehicles and removing them from the support wall. When not in use, the openings 44 are closed by suitable closures, not shown.

The molten metal collected in the hearth 18 is adapted to be withdrawn through the conventional tap hole or other passage into the refractory-lined trough 46. The trough 46 is provided with a well and slag dam 48 near the tap hole end, for skimming off and removal of the molten glass and other slag-type materials from the molten metal. The opposite end of the trough is provided with a spout 50, for directing the molten metal into a large-capacity holding ladle 54 supported for tilting on a pair of horizontal pivots 56. The molten metal can be desulphurized or otherwise treated in this ladle, which provides for a controlling source of molten metal to the endless conveyor type metal pigging machine 58. The pigging machine 58 can be operated continuously or intermittently as required by the flow of metal from the holding ladle. The molten metal solidifies in the pigging machine molds 60, to be discharged into storage bins or into freight cars. If the molten metal is desired at the source, for other uses, the pigging machine is by-passed.

Scrap vehicles from a storage yard or other source of supply are transported to a vehicle collapsing or squeezing apparatus 62 by means of a bridge crane 64. The bridge crane is of conventional construction and includes two parallel rows of steel columns 66 and 67, only one of the columns in each of the rows being shown. Parallel rails 68 and 69, which are fixedly mounted on the upper ends of the columns 66 and 67, support a travelling bridge 70 for movement therealong. A bridge trolley 72, which is mounted on the travelling bridge 70 for movement therewith and for movement along the length of the travelling bridge 70, carries a cable drum 73. A cable 74 having a vehicle bumper engaging hook 76 attached to the lower end thereof is wound on the cable drum 73 of the bridge trolley 72. An operator's booth 78 is suspended from adjacent one end of the travelling bridge 70. The bridge crane 64 includes power means controllable from the operator's booth 78 for selectively moving the travelling bridge 70 along the rails 68 and 69, for moving the bridge trolley 72 along the travelling bridge 70 for rotating the cable drum 73 to raise and lower the hook 76.

The vehicle collapsing or squeezing apparatus 62 as shown in FIGS. 1, 3, 4 and 5 is supported on a pair of parallel channel irons 80 which are fixed to the upper ends of supporting posts 82. The squeezing apparatus 62 is constructed and arranged to receive therein two whole scrap vehicles standing on end with the bottom surfaces of the vehicles in face to face relationship and to collapse at least the roof section of the vehicles to form a charge unit of generally circular configuration for insertion into the upper end of the furnace stack 32.

The squeezing apparatus 62, which is located close to the base of the furnace, includes a pair of spaced, metal columns 84 extending vertically upwardly from a rectangular shaped, metal base frame 86 fixedly mounted on the upper surface of the channel irons 80. A rigid, metal, gusset plate 88 of triangular shape is welded to opposite sides of the columns 84 and to the base frame 86 in order to brace the columns.

A pair of heavy, metal, elongated squeezing members 90 of semi-circular cross-sectional configuration are positioned between the columns 84 with their inner surfaces facing each other. The squeezing members 90 are positioned with their concave inner surfaces extending in a generally vertical direction and are pivotally mounted adjacent the lower ends thereof between the columns 84 on pivot pins 92. The pivot pins 92 are rigid with the squeeze members 90 and extend outwardly in opposite directions from the outer surface of said squeeze members adjacent the lower ends thereof. The outer ends of the pivot pins 92 are pivotally mounted in bearing openings provided in the columns 84. In the closed position as shown in solid lines, the squeezing members 90 provide a generally cylindrical configuration from top to bottom as viewed in transverse cross-section while in the open position, as shown in broken lines as in FIG. 3, the upper ends of the members 90 are spaced apart to receive therebetween pairs of vehicles standing on one end thereof.

Each of the squeezing members 90 is moved between the open and the closed position by a pair of conventional fluid motors 93 positioned on opposite sides and adjacent the upper ends thereof. The cylinder 94 of each of the fluid motors 93 is pivotally connected at one end thereof by means of a pivot pin 95 to a rigid block 96 extending upwardly from the upper surface of the columns 84. The piston rod 97, extending outwardly from the other end of each of the fluid motors 93, is pivotally connected to one end of a generally Z-shaped arm 98 which is welded or otherwise secured at the other end thereof to the outer surface of the respective squeeze member 90. Fluid under pressure for actuating the fluid motors 93 to move the squeezing members 90 between the open and the closed positions is connected thereto by the pies 99 attached to either end of the cylinders 94.

A series of parallel grate members 100 extend horizontally across the lower end of each of the squeeze members 90 for supporting thereon vehicles deposited in the squeezing apparatus 62 and for permitting glass and other small objects to fall freely therethrough.

The inner surface of each of the semi-cylindrical squeeze members 90 is provided with a partial lining of corrugated elements 103 having a series of large V-shaped, generally horizontally extending, annular grooves formed on the concave inner surface thereof for corrugating the roofs and bodies of vehicles squeezed in the apparatus.

The corrugating elements 103 have a generally cylindrical corrugated inner surface and are tapered downwardly and inwardly as shown in FIG. 5 to collapse the vehicle bodies to a smaller transverse dimension in the lower portion of the squeezing apparatus than in the upper portion thereof.

A pair of spaced, parallel elongated slots 105 are formed in each of the squeezing members 90 and in the corrugating elements 103 and extend from the upper ends thereof downwardly approximately ⅔ of the length of the squeezing members. These slots permit lifting tongs, to be described later, to pass freely therethrough to grip the squeezed vehicles in the squeezing apparatus 62 and to carry them to the upper end of the furnace stack. In order to guide the lifting tongs into the slots 105, a U-shaped guide member 107 is rigidly secured to the outer surface of each of the squeeze members 90 spanning said slots adjacent the upper end thereof.

One end of an endless belt conveyer 109 of conventional construction is disposed below the squeezing apparatus 62 and is supported between the upper ends of the posts 82 for receiving and carrying away broken glass and other small objects falling from the vehicles being collapsed in the squeezing apparatus.

The vehicles squeezed in the apparatus 62 are formed into a charge unit having a generally circular configuration and are lifted from the open squeezing apparatus and deposited on end in the upper open end of the stack of the furnace by hoisting apparatus generally designated by the numeral 111 mounted on the upper end of the stack or otherwise suitably supported. As shown, a framework 113 comprised of suitable steel members is fixedly secured at the lower end thereof to the outed surface of the stack 32 adjacent the upper end thereof by means of a metal band 115. The framework extends upwardly and outwardly from the metal band 115 and supports at the upper end thereof a rectangular, horizontally disposed, open steel frame 117.

A pair of spaced, parallel tracks 119 are supported at one end thereof on the end 121 of the framework 117 and at the other end thereof on a brace member 123 extending between the opposite sides of the frame 117. Additional brace members 125 are connected between the outer surfaces of the track members 119 and the adjacent side members of the frame 117. The inner opposed surfaces of the tracks 119 are recessed as at 127 to provide a trackway for the rollers 129 extending outwardly from opposite ends of the hoist carriage 131.

An electric hoist motor 133 is mounted on the hoist carriage 131 with the motor shaft supported in suitable bearings in opposite sides of the hoist carriage. The hoist carriage 131 is of generally square configuration and is open at the center thereof. A hoist drum 135 is fixedly secured to the shaft of the hoist motor 133 between the opposite ends thereof and is disposed in the open center portion of the hoist carriage 131. A hoist cable 137, fastened at one end thereof to the drum 135, extends downwardly and is provided at the other end thereof with lifting tongs generally designated by the numeral 139.

The lifting tongs 139 include pairs of L-shaped jaws 141 which are pivotally connected together by a pin 143 passing through the upper adjacent ends of the jaws. The pivot pin 143 is connected to the lower end of the hoist cable 137 by means of a swivel bearing member 145. Each of the L-shaped jaws 141 is formed by a pair of parallel rigid members 147 which are spaced apart a distance equal to the spacing of the slots 105 of the squeezing members 90 by rigid spacers 149 fixedly secured to the inner opposed surfaces of the parallel jaw members adjacent the upper ends thereof. The inner opposed surfaces of the jaws 141 are formed with a series of large V-shaped teeth 150 adapted to fit into the corrugations formed in the scrap vehicle bodies and roofs by the corrugating elements 103 of the squeezing apparatus 62. When the jaws 141 are in the closed position as shown in FIG. 8, the distance between opposed teeth increases from the lower end to the upper end of the tongs to conform to the corrugations formed along the length of the scrap vehicles by the tapered corrugating elements 103. By means of the arrangement described, a firm grip which will not slip off is obtained by the lifting tongs on the collapsed vehicles. The L-shaped jaws are moved between an open and a closed position by a conventional fluid motor 151, connected between the spacers 149 of the jaws 141, and supplied with fluid under pressure from a suitable source, not shown. The fluid motor 151 is adapted to be actuated by an operator stationed on the ground.

The hoist carriage is moved between the position shown in FIGS. 1 and 2 wherein the jaws 141 of the lifting tongs 139 are disposed in vertical alignment over the squeezing members 90 of the squeezing apparatus 62 and a position disposed vertically above the open end of the furnace stack 32 by means of a reversible electric motor 153 fixedly mounted on the frame 117 adjacent the end 155 thereof. The motor 153 is attached to the hoist carriage 131 by means of a chain 157 connected at opposite ends thereof to the opposite side members 159 and 161 of the hoist carriage and trained over a pair of sprockets 163 and 165, the first of which is fixedly mounted on the shaft of the reversible motor 153 and the second of which is mounted for rotation between a pair of pillow bearings 167 secured to the end 121 of the frame 117. The operation of the electric motors 133 and 153 is controlled by an operator stationed on or near the ground. A movable counterweight, not shown, may be mounted on the hoisting apparatus 111 to balance the weight of the vehicles being transferred.

Other suitable apparatus may be employed for transferring the shaped charge units from the squeezing apparatus 62 to the upper end of the furnace stack such as an inclined trackway, not shown, supporting and guiding a power driven chain or cable extending from the squeezing apparatus 62, to the top of the stack to which the lifting tongs 139 would be attached.

The upper end of the stack 32 is provided with opposed pairs of vertical slots 168 and 169 spaced apart the same distance as the rigid members 147 of the lifting tongs 139 for the passage of the jaws therethrough for inserting scrap vehicles into the stack or, when necessary, removing them therefrom. The pairs of slots 168 and 169 are disposed 90° apart so that adjacent charge units of scrap vehicles may be inserted into the stack turned 90° out of phase. If desired, guide members (not shown) similar to the guide members 167 may be attached to the outer surface of the stack close to the upper end thereof spanning each pair of slots for guiding the lifting tongs into said slots. The efficiency of the furnace is increased by arranging the vehicles in the column 90° out of phase with the vehicles disposed immediately above or below since the rapid escape of the hot gases upwardly past the sides of aligned vehicles is prevented and additional turbulence is imparted to the hot gases in the stack to bring them into more intimate contact with the vehicles in the stack for preheating them to a higher degree. If desired, the area between the upper end of the stack and the hoisting apparatus 111 may be partially enclosed to protect the hoisting apparatus from any foreign matter discharged from the stack.

The modified form of furnace illustrated in FIG. 10 may also be employed for melting scrap vehicles. This furnace includes a base hearth 171 mounted on a suitable concrete foundation 173. The hearth is lined with a suitable insulating material 175 disposed within the outer steel shell 177 of the furnace.

The combustion and melting zone of the furnace 179 extends upwardly from the hearth and is provided with an unlined steel wall 181 extending upwardly from a radially inwardly extending shoulder 183 connected to the upper end of the wall of the hearth. The furnace stack 185 is disposed above the combustion zone and is provided with an outer steel shell 187 supported on the wall 181 of the combustion chamber by a radially inwardly extending shoulder 191 formed at the lower end thereof. The stack 185 is lined at the lower end thereof adjacent the combustion chamber with high temperature ceramic brick 193 and the upper portion of the stack is lined with low cost, wear resistant, cast ferrous metal blocks 195. The upper end of the stack is provided with vertically extending slots, not shown, of the type described in connection with the furnace illustrated in FIGS. 1 and 7 and the hoisting apparatus 111 is mounted on the upper end of the stack in the same manner as that described above.

The wall 181 of the melting zone 179 is enclosed within a water jacket 197 through which water may be circulated for cooling the combustion chamber wall. The interior of the furnace illustrated in FIG. 10, is of the same dimension in the hearth 171, in the combustion and melting zone 179 and in the stack 185. A charge of coke 200 is positioned in the lower end of the furnace and extends upwardly from the hearth into the combustion zone. The upper surfaces of the coke provides a support for a column of scrap vehicles in the stack. Air for supporting combustion in the furnace is provided from a suitable source of air, preferably heated, passing through conduits 202 and tuyere openings 204 formed in the steel shell 177 and in the lining 175. The molten metal resulting from the melting of the lowermost charge unit in the stack descends through the charge of coke 200 and collects in the base or hearth 171 of the furnace from which it may be tapped or withdrawn in the conventional manner. The scrap vehicles deposited in the stack of this furnace may have a charge of coke and limestone placed in the vehicle or the required charge of coke and limestone may be inserted in the stack separately from time to time as needed for the efficient operation of the furnace.

In the operation of the present invention, whole scrap vehicles, which are stored within range of the bridge crane 64 or are otherwise supplied thereto, are lifted by the hook 76 engaged under the rear bumper of the scrap vehicles and they are deposited in the open squeezing apparatus 62. A vehicle is placed in each of the squeezing members 90 standing on the front end on the grate members 100, the lower surface of the vehicles being disposed in face-to-face relationship with the roofs resting against the corrugating elements 103 of the respective squeezing member 90. Before placing the scrap vehicles in the squeezing apparatus, such items as the copper radiator, battery, tires, and motor block, if it is cast aluminum, may be removed if they can be sold more profitably than the reclaimed ferrous metal.

The fluid motors 93 are actuated simultaneously by an operator stationed near the squeezing apparatus to move them from the open to the closed position. The squeezing apparatus will press the vehicles together forming elongated furnace charge units having corrugations formed in the roof portion thereof by the corrugating elements 103. The hoist motor 133 will next be actuated by the operator of the hoist apparatus 111 to lower the lifting tongs 139 in the open position into the elongated slots 105 of the closed squeezing apparatus 62. The fluid motor 151 will then be actuated to move the jaws 141 of the lifting tongs 139 from the open to the closed position to firmly grip the vehicles. The spaced teeth 150 of the jaws 141 will engage in the corrugations formed in the vehicle roof by the corrugating elements 103 providing a good grip on the charge unit formed by the vehicles. After the vehicles are firmly gripped by the lifting tongs 139, the fluid motors 93 of the squeezing apparatus 62 will be actuated to move the squeezing members 90 from the closed to the open position. The hoist motor 133 will then be actuated to lift the vehicles gripped by the lifting tongs 139 from the squeezing apparatus 62 and to raise them to an elevation above the upper end of the stack of the furnace 1. The motor 153 will then be actuated to move the hoist carriage 131 from its position disposed above the squeezing apparatus 62 to a position directly above the opening in the stack 32 of the furnace. At this point, the hoist motor 133 will again be actuated to lower the lifting tongs 139 with the vehicle charge unit gripped thereby into the upper open end of the stack. The jaws 147 will enter the slots 168 formed in the upper end of the stack as the lifting tongs 139 are lowered. If desired, the lifting tongs 139 may be rotated through an angle of 90° to enter the slots 169 formed in the upper end of the furnace stack in order to arrange successive charge units in the stack 90° out of phase.

The hydraulic motor 151 of the lifting tongs 139 is then actuated to move the jaws 141 from the closed to the open position releasing the charge unit from between the jaws and permitting it to freely descend in the furnace stack. The first charge unit deposited in the furnace stack will come to rest on the wall 28 and the charge units inserted thereafter will be supported in a column, one on another, resting on the lowermost charge unit.

The combustion of the fuel in the combustion chamber 16 will melt the lowermost vehicle in the column progressively from the lower to the upper end thereof resulting in lowering the remaining charge units in the stack which in turn come to rest on the wall 28 where they will be melted progressively.

In the event that a portion of any of the vehicle becomes lodged or hung-up on the wall 28, oxygen or acetylene torches may be inserted through the openings 44 to remove such portions.

The molten metal resulting from melting the vehicles falls through the combustion chamber and into the hearth 18 from which it may be withdrawn through the conventional tap opening into the trough 46. The slag and other foreign material may be removed by suitable means from the trough and the molten metal withdrawn from the trough through the spout 50 and deposited into the holding ladle 54 for transfer to the movable molds 60 of a conventional pigging machine.

Obviously it would be feasible to melt whole scrap vehicles disposed singly standing end on end in a vertical column in the furnace stack with the lowermost vehicle resting on the wall 28 in the same manner as it would to melt pairs of vehicles squeezed together to form a charge unit.

The offset or restriction provided at the upper end of the combustion chamber by the walls 25 and 28 makes it possible to operate the furnace with gaseous fuel or with liquid fuel such as low cost bunker oil. As previously mentioned, the offset provides for better control of combustion in the combustion zone and by supplying thereto less air than would be required for complete combustion of the gas or oil fuel furnished thereto, it is possible to maintain a reducing atmosphere in the combustion zone. By operating the furnace with a reducing atmosphere in the combustion zone oxidation of the ferrous metal being melted does not occur. Complete combustion of the fuel carried by the hot gases passing upwardly through the furnace stack results from introducing sufficient air into the stack through the passages 42 formed therein and the additional heat resulting from combustion taking place in the stack aids in preheating and burning out nonferrous material from the vehicles disposed in the column supported on the wall 28 before they reach the melting zone.

The term whole scrap vehicles is intended to include those from which certain items such as the copper radiator, battery, tires and motor block, if it is of cast aluminum, have been removed. If desired, other ferrous scrap may be placed inside the vehicle bodies or between the chassis before they are compressed into a charge unit in the squeezing apparatus 62.

While a specific embodiment of the present invention has been described and illustrated, such modifications and alterations as would occur to one skilled in the art are to be considered within the spirit of this invention as fall within the scope of the appended claims.

What I claim is:

1. A process for disposing of scrap vehicles and collecting the ferrous metal content thereof by forming compressed charge units from whole scrap vehicles and for continuously melting the charge units in a melting zone, comprising: positioning pairs of whole scrap vehicles in a compressing zone with their bodies extending in the same direction and with their bottom surfaces in face-to-face relationship; compressing the pairs of vehicle bodies together to collapse the bodies thereof and form compressed charge units; depositing a plurality of the charge units on one end thereof, one upon another, in a vertical column with the lowermost of the charge units supporting said column and being positioned in a melting zone; heating and melting the lowermost charge unit in the column thereby lowering the next above charge unit into the melting zone; melting in turn each of the charge units descending into the melting zone; and collecting the molten metal resulting from melting said charge units.

2. A process for disposing of scrap vehicles and collecting the ferrous metal content thereof by forming compressed charge units from whole scrap vehicles and for continuously melting the charge units in a melting zone, comprising: positioning pairs of whole scrap vehicles on one end thereof in a compressing zone with their bodies extending in the same direction and with their bottom surfaces in face-to-face relationsip; compressing the pairs of vehicle bodies together to collapse the bodies thereof and form compressed charge units of generally circular transverse configuration; depositing a plurality of the charge units on one end thereof, one upon another, in a vertical column with the lowermost of the charge units supporting said column and being positioned in a melting zone, the bodies of the vehicles in each of said charge units being disposed 90° out of phase with respect to the bodies of the vehicles in the immediately adjacent charge unit; heating and melting the lowermost charge unit in the column thereby lowering the next above charge unit into the melting zone; melting in turn each of the charge units descending into the melting zone; and collecting the molten metal resulting from melting said charge units.

3. A process for forming charge units from whole scrap vehicles and for continuously melting the charge units in the melting zone of a stack furnace, comprising: positioning pairs of whole scrap vehicles with their bodies extending in the same direction and with their bottom surfaces together in a compressing zone; compressing the pairs of vehicle bodies together to collapse the bodies thereof and form elongated furnace charge units; transferring a plurality of the charge units from said compressing zone and depositing them on one end thereof, one on another, in a vertical column in the stack of the furnace with the lowermost of the charge units supporting the charge units disposed thereabove and being positioned in the melting zone of the furnace; heating and melting the lowermost charge unit in the column in the melting zone of the furnace thereby lowering the next above charge unit into the melting zone for melting; melting in turn each of the charge units descending into the furnace melting zone; and withdrawing the molten metal from the furnace.

4. A process as defined in claim 3 including the step of preheating the unmelted charge units disposed in the column with the hot products of combustion gases from the melting zone of the furnace to a temperature below that required for melting ferrous metal and above temperature required for burning low temperature non-ferrous material out of the charge units before they reach the melting zone.

5. A process as defined in claim 3 wherein a reducing atmosphere is maintained in the melting zone.

6. A process as defined in claim 5 including the step of supplying air to the hot reducing gases passing from the melting zone upwardly through the furnace stack and around the column of vehicles to complete combustion of the unburned fuel contained in said gases and to preheat the column of unmelted vehicles to a high temperature.

7. A process for continuously melting whole scrap vehicles and reclaiming the ferrous metal content thereof, comprising: positioning pairs of whole scrap vehicles with their bodies extending in the same direction and with their bottom surfaces together in a compressing zone; compressing the pairs of vehicle bodies together to collapse the bodies thereof and form elongated charge units; depositing a plurality of the charge units on one end thereof, one on another, in a vertical column in the stack of a furnace with only the lowermost of the charge units being disposed in the melting zone of the furnace; heating and progressively melting the lowermost charge unit in the column from the lowermost end to the upper end thereof in the melting zone adjacent the bottom of the furnace thereby gradually lowering the column of unmelted charge units and positioning the next above charge unit in the melting zone of the furnace for progressive melting; melting progressively each of the charge units descending in turn into the melting zone of the furnace; depositing additional charge units on the top of the column in the furnace to replace the melted charge units; withdrawing the molten metal from the hearth of the furnace; removing the slag from the withdrawn molten metal; and depositing the molten metal into a series of movable molds to form metal pigs of a predetermined size.

8. A process for melting whole scrap vehicles, comprising: positioning a pair of whole scrap vehicles with their bodies extending in the same direction and with their bottom surfaces together to form furnace charge units; depositing the charge units in the melting zone of a metal melting furnace; heating and melting the charge unit in the melting zone of the furnace and withdrawing the molten metal from the lower portion of the furnace.

9. A process for continuously melting scrap vehicles in a stack furnace, comprising: positioning pairs of whole scrap vehicles with their bodies extending in the same direction and with their bottom surfaces together; compressing the pairs of vehicle bodies together to collapse the bodies thereof and form compressed furnace charge units, depositing a plurality of the charge units on one end thereof, one on another, in a vertical column in the stack of the furnace with only the lowermost of the charge units being positioned in the melting zone of the furnace; heating and melting the lowermost charge unit in the column in said melting zone thereby lowering the column of unmelted charge units and positioning the next above charge unit in the melting zone of the furnace for melting; and withdrawing the molten metal from the hearth of the furnace.

10. A process as defined in claim 9 wherein the step of compressing the pairs of vehicle bodies together collapses only the roof section of the bodies.

11. A process for melting whole scrap vehicles, comprising: collapsing a plurality of whole vehicle bodies to form elongated furnace charges; depositing at least two of the elongated charges on one end thereof, one on another, in a vertical column in a metal melting furnace with the first and lowermost of the charges being positioned in the melting zone of the furnace and with the second and next above charge being positioned above said melting zone; heating and melting the first and lowermost charge in the melting zone of the furnace, thereby lowering the second and next above unmelted charge into the melting zone of the furnace; heating and melting the second charge in the melting zone of the furnace; and withdrawing from the furnace the molten metal resulting from the melting of the charges.

12. A process for continuously melting scrap vehicles, comprising: collapsing a plurality of whole vehicle bodies to form elongated furnace charges; depositing the collapsed charges on one end thereof on one another in a vertical column in the stack of a furnace with only the lowermost charge positioned in the furnace melting zone, melting the lowermost charge in the column in the melting zone adjacent the bottom of the furnace thereby lowering the column of unmelted charges and position the next above charge in said melting zone for melting; melting successively each charge descending into the melting zone, and withdrawing the molten metal from the lower portion of the furnace.

13. A process for continuously melting whole scrap vehicles, comprising: depositing the whole scrap vehicles on one another in a vertical column in the stack of a metal melting furnace, with only the lowermost vehicle positioned in the furnace melting zone; melting the lowermost vehicle in the column in the melting zone adjacent the bottom of the furnace thereby lowering the column of unmelted vehicles and positioning the next above vehicle in said melting zone for melting; melting successively each of the vehicles descending in turn into the high temperature melting zone; depositing additional vehicles on the top of the column in the furnace to replace the melted vehicles; and collecting the molten metal resulting from the melting of the scrap vehicles.

14. A process for continuously melting whole scrap vehicles in a stack furnace, comprising: depositing the whole scrap vehicles on one end thereof on one another in a vertical column in the furnace stack, with only the lowermost vehicle positioned in the furnace melting zone; preheating the unmelted vehicles in the column with the hot product of combustion gases passing upwardly through the stack from the melting zone to a temperature below that required for melting ferrous metal and above a temperature required for melting the non-ferrous material contained in the vehicles; melting the lowermost vehicle in the column in a reducing atmosphere in the melting zone adjacent the bottom of the furnace thereby lowering the column of unmelted vehicles and positioning the next above vehicle in said melting zone for melting; supplying air to the hot reducing gases in the stack to complete combustion of the unburned fuel contained therein and withdrawing from the furnace the molten metal resulting from the melting of the scrap vehicles.

15. Apparatus for forming charge units from whole scrap vehicles and continuously melting the charge units in a stack type furnace to recover in useable form the ferrous metal content thereof, comprising: a hearth, means defining a high temperature, metal melting combustion zone disposed above said hearth; a stack disposed above said combustion zone having a passage large enough to receive compressed charge units; at least one annular row of equally spaced fuel nozzles adjustably mounted in the wall of the combustion zone; an inwardly and downwardly inclined, annular ledge extending inwardly from the inner wall of the combustion zone and disposed above said fuel nozzles for supporting a column of compressed charge units thereon; a water circulation jacket surrounding and enclosing the outer wall of said annular ledge for cooling said ledge; apparatus for receiving pairs of whole vehicles standing in a vertical position upon one end with their bottom surfaces arranged in face-to-face relation and for pressing them together to collapse the bodies thereof to form a compressed furnace charge unit adapted to slide freely downwardly in the stack of the furnace; hoist means for removing said charge units from said apparatus and depositing them on end, one after another in the upper end of the furnace stack to form therein a vertical column of the charge units with the lowermost charge unit resting on said annular ledge and supporting the remainder of the charge units in a column; collecting means connected with the hearth of the furnace for receiving therefrom the molten metal resulting from melting said charge units; means for removing slag from the molten metal in the collecting means and movable molds disposed adjacent said collecting means for receiving therefrom said molten metal from which the slag has been removed.

16. Apparatus for continuously processing whole scrap vehicles, comprising: squeezing apparatus for receiving pairs of whole scrap vehicles, standing in a vertical position upon one end thereof with their bottom surfaces in face-to-face relationship and for squeezing them together to collapse the bodies thereof and form a compressed furnace charge unit therefrom; a stack furnace having a hearth; means defining a combustion chamber disposed above said hearth; a stack disposed above said combustion chamber having an opening therein of a size to permit charge units of whole scrap vehicles to descend freely therethrough to the combustion zone; support means disposed in said combustion chamber for supporting a column of the scrap vehicle charge units resting upon one another in the furnace stack; means for removing the charge units from the squeezing apparatus and for inserting them into the upper end of the stack of the furnace to form a column of the charge units in the stack; and means for tapping molten metal from said hearth.

17. Apparatus for compressing and continuously melting whole scrap vehicles, comprising: means for simultaneously squeezing a pair of whole scrap vehicles to reduce their size to provide a partially compressed charge unit; a stack furnace for melting such charge units having a stack with a passage large enough to receive at least one of said compressed charge unit; and meant for gripping successive compressed charge units while they are being held in said squeeze means, removing them from said squeeze means and depositing them in said stack.

18. A gas fired stack furnace for melting whole scrap vehicles, comprising: a hearth, means defining a high temperature metal melting combustion chamber disposed above said hearth; a vertical stack disposed above said combustion chamber having an opening therein of a size to permit whole scrap vehicles to be melted to freely descend therethrough; gas burner means in said combustion chamber; a downwardly and inwardly extending annular ledge extending inwardly from the wall of said combustion chamber above said burner means and having an opening therein smaller than the transverse dimension of the scrap vehicles in the stack and providing a support for a column of the scrap vehicles resting one upon another in the stack; a water jacket through which water is adapted to be circulated enclosing said annular ledge for cooling the same; a plurality of torch openings formed in the wall of the stack adjacent the upper surface of said annular ledge through which metal melting torches are adapted to be inserted for cutting and removing unmelted portions of vehicles lodged on said ledge; said stack having oppositely disposed vertical slots formed in the upper end thereof and extending downwardly from said upper end a distance sufficient to permit tongs of a hoist to pass freely therethrough for inserting scrap vehicles into the upper end of the stack and with a plurality of passages extending inwardly and upwardly through the wall of the stack for supplying additional air to the stack to insure complete combustion of the gases passing upwardly therethrough, said passages being disposed between said torch openings and the lower end of said slots.

19. A stack furnace adapted particularly for melting whole scrap vehicles, comprising: a hearth, means defining a combustion chamber disposed above said hearth; a stack, having an opening therein of a size to permit whole scrap vehicles to be melted to descend freely therethrough, disposed above said combustion chamber; burner means in said combustion chamber; an annular metal flange disposed above said burner means and in the furnace combustion zone extending inwardly from the wall of said furnace between an angle of 0° to the horizontal and a downwardly inclined angle of 45° to the horizontal for supporting directly thereon a column of the scrap vehicles resting upon one another in the stack; and a water jacket through which water for cooling the annular flange is adapted to be circulated surrounding and enclosing the outer wall of said metal flange.

20. A stack furnace for melting whole scrap vehicles, comprising: a hearth; means providing a combustion chamber disposed above said hearth; a stack having an opening therein of a size to permit whole scrap vehicles to be melted to descend freely therethrough, disposed above said combustion chamber; burner means in said combustion chamber; and support means disposed in said combustion zone above said burner means and extending inwardly from the wall of said furnace between an angle of 0° to the horizontal and a downwardly inclined angle of 45° to the horizontal for engaging the lowermost vehicle in the stack until it is at least partially melted and for supporting a column of the scrap vehicles resting upon one another in the stack.

21. A stack furnace for melting whole scrap vehicles, comprising: a hearth; means providing a combustion chamber disposed above said hearth; a stack having an opening therein of a size to permit whole scrap vehicles to be melted to descend freely therethrough, disposed above said combustion chamber; and support means disposed in said combustion chamber for supporting a column of the scrap vehicles resting upon one another in the stack, said stack having oppositely disposed vertical slots formed in the upper end thereof and extending downwardly from said upper end a distance sufficient to permit tongs of a hoist to pass freely therethrough for inserting scrap vehicles into the upper end of the stack.

22. A stack furnace for melting whole scrap vehicles, comprising: a hearth, means providing a combustion chamber disposed above said hearth; a stack having an opening therein of a size to permit whole scrap vehicles to be melted to descend freely through the entire length thereof, disposed above said combustion chamber; support means disposed in said combustion zone for supporting a column of the scrap vehicles resting upon one another in the stack; said support means extending into the passage between the stack and the combustion chamber between an angle of 0° to the horizontal and a downwardly inclined angle of 45° to the horizontal; said stack having a plurality of induced air passages extending inwardly and upwardly through the wall thereof for supplying by induction additional air to the stack to insure complete combustion of the gases passing upwardly therethrough from the combustion chamber and means for controlling the rate of flow of the induced air through said passages.

23. A stack furnace for melting whole scrap vehicles, comprising: a hearth; means providing a combustion chamber disposed above said hearth; a stack having an opening therein of a size to permit whole scrap vehicles to be melted to descend freely therethrough, disposed above said combustion chamber; and support means disposed in said combustion chamber for supporting a column of the scrap vehicles resting upon one another in the stack, said stack having a plurality of torch openings formed in the wall thereof adjacent the upper surface of said support means through which metal melting torches are adapted to be inserted for cutting and removing unmelted portions of the scrap vehicles being melt lodged on the support means.

24. A stack furnace for melting whole scrap vehicles, comprising: a hearth; means providing a combustion chamber disposed above said hearth; a stack having an opening therein of a size to permit whole scrap vehicles to descend freely therethrough, disposed above said combustion chamber; metallic support means disposed in said combustion zone and extending into the passage between the stack and the combustion chamber between an angle of 0° to the horizontal and a downwardly inclined angle of 45° to the horizontal for supporting a column of the scrap vehicles resting upon one another in the stack and means for cooling said support means.

25. A stack furnace for melting whole scrap vehicles, comprising: a hearth; means providing a combustion chamber disposed above said hearth; a stack disposed above said combustion chamber having a passageway therein of a size large enough for whole scrap vehicles to descend freely therethrough; and support means disposed in said combustion zone for engaging the lowermost scrap vehicle in the stack until it is at least partially melted and for supporting a column of the scrap vehicles resting upon one another in the stack, said support means partially obstructing the passage between the stack and the combustion chamber and with the supporting surface of said supporting means being between an angle of 0° to the horizontal and a downwardly inclined angle of 45° to the horizontal.

References Cited

UNITED STATES PATENTS

| | | | |
|---|---|---|---|
| 1,997,603 | 4/1935 | Spalding | 75—41 |
| 2,291,083 | 7/1942 | Jung | 266—33 |
| 2,382,534 | 8/1945 | Baily | 75—12 |
| 2,465,463 | 3/1949 | Lindemuth | 75—43 |
| 2,886,304 | 5/1959 | Guthrie | 266—13 |
| 2,986,992 | 6/1961 | Patros et al. | 100—218 |

DAVID L. RECK, *Primary Examiner.*

H. W. TARRING, *Assistant Examiner.*